Aug. 29, 1944.  F. O. HICKLING  2,357,196
CAGE FOR USE IN BALL BEARINGS
Filed March 27, 1942   2 Sheets-Sheet 1
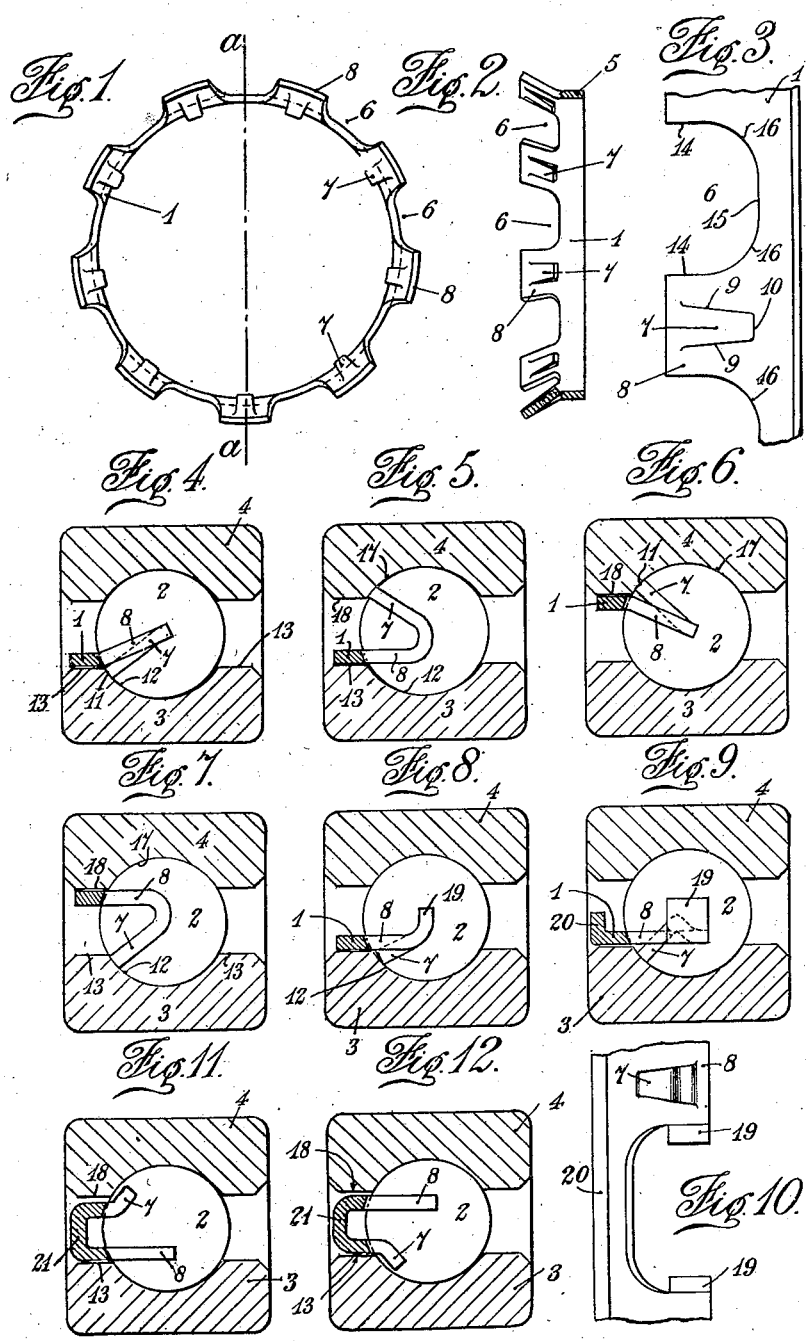
INVENTOR
Frederick O. Hickling
BY
ATTORNEY.

Aug. 29, 1944.  F. O. HICKLING  2,357,196
CAGE FOR USE IN BALL BEARINGS
Filed March 27, 1942  2 Sheets-Sheet 2
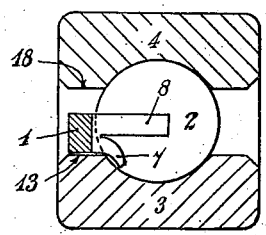
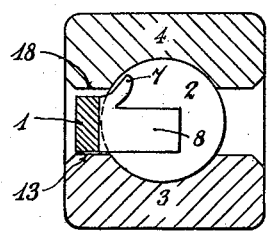
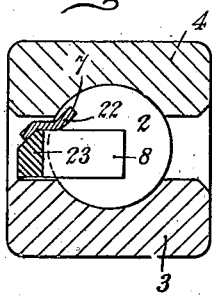
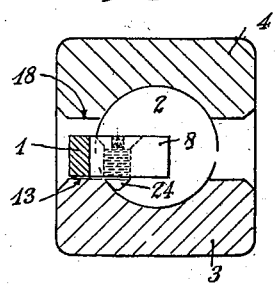
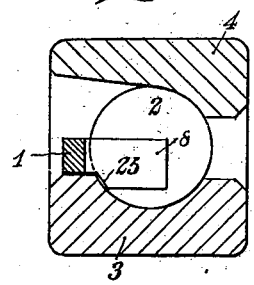
INVENTOR
Frederick O. Hickling
BY
ATTORNEY Patented Aug. 29, 1944

2,357,196

UNITED STATES PATENT OFFICE 2,357,196

CAGE FOR USE IN BALL BEARINGS

Frederick Osgood Hickling, West Bridgford, Nottingham, England, assignor to Ransome and Marles Bearing Company Limited, Newark-on-Trent, Nottingham, England, a British company Application March 27, 1942, Serial No. 436,523
In Great Britain August 6, 1940

10 Claims. (Cl. 308—201)

This invention relates to improvements in cages for use in single or double row ball bearings of any of the usual types either with or without a filling notch and more particularly to improvements in one piece cages, the construction being such that a more efficient cage can be provided at a cheaper cost.

Hitherto in one piece cages the location of the cage in the bearing laterally has always been effected on the balls, but the chief object of the present invention is to provide a cage of simple design which can be located and held laterally in the bearing in an improved manner.

A further object is to provide a one piece cage preferably of the pressed type with resilient prongs or fingers to retain the cage against lateral movement.

With these and other objects in view the invention consists in forming or providing a cage with means whereby it can be located laterally in the bearing and held in one direction against the balls and in the opposite direction against the side of the track.

The invention further consists in forming a cage preferably from pressed material shaped with recesses or slots to engage the balls and formed intermediately of the ball recesses with pressed out fingers or prongs adapted to engage against the side of one of the ball tracks so that the cage will be retained laterally in opposite directions.

The invention still further consists in so constructing the cage with ball spacing projections and with prongs or fingers adapted to be passed over the diameter of the shoulder of one of the ball rings and to spring back into a position to engage the race or track of the ring so as to hold the cage and the balls on the said ring.

The invention will now be described with reference to the accompanying drawings, in which:

Figure 1 is a side view of one form of cage constructed according to this invention.

Figure 2 is a cross sectional view taken on the line a—a of Figure 1.

Figure 3 is an enlarged detail view of a portion of the cage.

Figure 4 is a section showing the cage disposed in the rings of a ball bearing;

Figures 5, 6 and 7 are similar views to Figure 4 showing cages of modified form.

Figure 8 is a similar view to Figure 4 showing a further modified form of cage.

Figure 9 is a section of a further modified form of cage, the bearing rings being shown in section.

Figure 10 is a detail of part of the cage shown in Figure 9;

Figures 11 and 12 are similar views to Figure 9 showing two further modified forms.

Figures 13 and 14 show in section two examples of a cage of more solid construction;

Figure 15 is a cross section of the rings of a ball bearing showing a cage having a ring-like plate to provide track engaging fingers;

Figure 16 is a similar view showing a cage in which the fingers are in the form of screws; and Figure 17 is a similar view showing a cage of still more solid construction.

According to one form of this invention and as shown more particularly in Figures 1 to 4, a cage 1 for balls 2 in a ball bearing consisting of inner and outer rings 3 and 4 respectively is in the form of a pressed metal sleeve 5 provided with a plurality of slots or recesses 6 each of a width substantially equal to the diameter of the ball 2, the material between the recesses 6 being formed with prongs or fingers 7 by cutting and pressing. The main diameter of the cage 1 is substantially equal to the outer diameter of the inner ring 3 of the bearing and the material between the recesses 6 is flared outwardly or coned so that this forms inclined projections 8 which extend slightly beyond the ball centres. The prongs or fingers 7 in these ball spacing projections 8 are formed by providing a pair of slightly inclined cuts 9 and a connecting cut 10, the latter being parallel with and spaced from the main cylindrical portion of the cage 1. These prongs or fingers 7 which have their root at substantially the ball centres are bent inwardly so that their ends 11 project within the main diameter of the cage 1 and engage against the side of the ball race or track 12 formed in the usual manner in the inner ring 3 of the bearing between the shoulders 13 of the ring. The slots or recesses 6 are preferably formed with parallel side faces 14 and a flat base 15 with rounded corners 16 so that each slot or recess 6 is of substantially flat U shape. The bottoms 15 of the slots 6 are adapted to butt against the balls 2 and the ends 11 of the prongs or fingers 7 are adapted to butt against the side of the ball track 12 formed in the inner ring 3. Thus the location of the cage 1 in one direction is against the balls 2 but in the opposite direction against the side of the track 12. Obviously the prongs 7 to take up their correct position after assembly must be capable of being passed over the inner ring diameter or shoulder 13 and to spring back to engage the ball track 12 to retain the cage 1 and balls 2 on the inner ring 3.

In the above described construction the projections 8 are outwardly formed and incline slightly beyond the centre of the balls 2 and the prongs or fingers 7 which double back to engage the side of the track 12 of the inner ring 3 form a V having its apex substantially coincident with the centre of the balls 2 arranged in the bearing but if desired the projections 8 and prongs 7 may be so arranged that the prongs 7 engage the side of the track 17 of the outer ring 4 of the bearing as shown in Figure 5. The main portion of the cage 1 may be of such diameter so to seat either on the side face or shoulder 13 adjacent to the ball track 12 of the inner ring 3 as shown in Figures 4 and 5 or on the side face or shoulder 18 of the outer ring 4 as shown in Figures 6 and 7. When the prongs or fingers 7 are shaped to engage the opposite ring the projections 8 which partially embrace the balls 2 may be conveniently shaped to lie in alignment with the main portion of the cage 1. The prongs or fingers 7 may have their root coincident with the centre of the balls 2 or at a point either outwardly or inwardly of the pitch circle of the balls 2.

In a further modified construction as shown in Figure 8 the ball spacing projections 8 are not inclined as in the constructions shown in Figures 4 and 6 but formed with shaped extensions 19 to space the balls 2 at or adjacent to the pitch circle of the balls and the prongs or fingers 7 are bent inwardly to engage the track 12 of the inner ring 3 of the bearing. Obviously the prongs or fingers 7 may be bent outwardly to engage the track of the outer ring in a somewhat similar manner to that shown in Figure 5.

In a still further modified construction as shown in Figures 9 and 10 the main portion of the cage 1 is of L shape in cross section by providing a flange 20. In this case the ball spacing projections 8 are formed with shaped extensions 19 to space the balls at or adjacent to the pitch circle of the balls and the prongs or fingers 7 are bent outwardly and inwardly or vice versa to a V formation to engage either of the tracks.

In further modifications as shown in Figures 11 and 12 the main portion of each cage 1 is of channel or U shape as indicated at 21 to lie between the shoulders 13 and 18 of the inner and outer rings 3 and 4 of the bearing respectively and adjacent to the tracks so that the projections 8 extend beyond the pitch centre of the balls 2 and either inwardly or outwardly of the said centre, the prongs 7 being bent to engage the side of the track of the outer ring 4 or the inner ring 3 respectively.

In fitting up bearings as above described the requisite number of balls 2 is assembled into the tracks 12 and 17 of the bearing rings 3 and 4 by the usual method and the balls are spaced equally around the tracks in the usual way. The cage 1 is then placed between the rings 3 and 4 and pressure is applied so that the prongs or flanges 7 are sprung to pass over the shoulder of the bearing ring. This pressure is continued until the cage is fully in place when the prongs or fingers 7 spring back to engage against the side wall of either the inner or outer track according to the particular construction of the cage.

Thus assembly time is reduced to a minimum and cleanliness of the operation is infinitely improved particularly when compared with two piece cages which are fitted by means of rivets or other means.

In the above constructions the cage is formed and pressed out of thin material but the cage may be of a more solid nature to provide spacing projections of a substantial character as shown for instance in Figures 13 and 14. In these cases the resilient prongs or fingers 7 are formed by cutting and bending out a portion of each projection 8 so that the prongs or fingers 7 lie adjacent to the side wall of the ball track and extend inwardly thereof. Thus the projections 8 are of such thickness as to engage and space the balls 2 above and below their pitch circle and the fingers or prongs 7 have their root adjacent to the main portion of the cage 1 lying between the shoulders 13 and 18 of the inner and outer rings 3 and 4 of the bearing respectively. The prongs or fingers 7 are preferably formed by undercutting each ball spacing projection 8 so that on assembly the tapered prongs 7 can be conveniently bent over from the other side of the bearing by a suitable punch and pressure to engage with the side wall of the track.

In a further modified construction as shown in Figure 15, the prongs or fingers 7 may be formed in a separate ring-like plate 22 of a resilient character arranged and secured in any suitable manner on the ring portion 23 of the cage 1 formed with the ball spacing projections 8. This construction would be particularly suitable and applicable to non-metallic cages. The fingers 7 of the ring-like plate 22 which would preferably be of metal may either be sprung over or bent over as hereinbefore described. In a cage of more solid construction than pressed metal the projections adapted to space the balls may be of substantial thickness and if desired equal to the main or ring portion of the cage which is adapted to be positioned between the shoulders 13 and 18 of the ring-like inner and outer track members 3 and 4 and the prongs or fingers may be in the form of screws 24 threaded into the projections 8 as shown in Figure 16 or in the form of pegs to engage with the side wall of one of the tracks on which the row of balls are adapted to seat and revolve in the usual manner. The screws or pegs would conveniently be fitted or finally adjusted after the cage has been assembled into the bearing. Alternatively, the cage 1 may be held laterally by means of a notch 25 on each projection 8 to engage against the side of the ball track as shown in Figure 17 the notches being formed by increasing the thickness of the ball spacing projections 8. In this case the cage 1 is passed over one shoulder of, for instance, the inner ring 3 which is reduced in diameter and then the balls 2 are assembled, the outer ring 4 being afterwards placed in position conveniently by heat and pressure in the usual manner.

It will be seen from the above that in all cases the cage is located laterally in one direction against the balls and in the opposite direction against the track. When in service the cage allows a much greater grease or lubrication space around the balls and thus the serviceability is greatly improved. Obviously the cages above described may be used in all types of single or double row ball bearings either of the non-filling slot type or filling slot type, double purpose type or cup and cone type.

What I claim is:
1. A cage for use in ball bearings of the type including an inner race, an outer race, and balls cooperating with said races, said cage including a unitary member having ball spacing elements to cooperate with and space the balls and locking members forming relatively movable parts of said elements to have endwise abutment against one of the races of the bearing.

2. A construction as defined in claim 1, wherein the locking members are at an angle to the ball spacing elements.

3. A construction as defined in claim 1, wherein the spacing elements are formed to provide free ends relatively positioned to receive the balls between them, and wherein the locking elements have their roots in said spacing elements adjacent such free ends and incline relative to such spacing elements in a direction away from the free ends of the spacing elements.

4. A ball bearing cage including a ring shaped on one edge to provide spaced projections to fit between and space the balls of a bearing, certain of the projections being cut to form fingers connected to the projections at one end otherwise free of such projections, the fingers being bendable at an angle to the projections to arrange their free ends as locking abutments in the application of the cage.

5. A ball bearing cage including a ring formed on one edge to provide spaced projections to be positioned between the balls of the bearing for spacing purposes, that portion of the ring remote from the spacing ends of the projections defining an abutment for cooperation with the balls of the bearing to limit movement of the cage relative to the balls in one direction axially of the bearing, and movable fingers carried by said projections and terminally spaced therefrom to provide a stop to bear against the inner surface of a bearing part to limit movement of the cage in the opposite axial bearing direction relative to the balls.

6. A construction as defined in claim 5, wherein the fingers are formed as parts divided from the projections.

7. A construction as defined in claim 5, wherein the fingers are divided from the material forming the projections.

8. A construction as defined in claim 5, wherein the fingers are divided from the material forming the projections and connected to the projections adjacent the free ends of such projections and extending free of such projections toward the ring-connected ends of the projections.

9. A ball bearing cage for use in ball bearings of the type including an inner race, an outer race, and balls intermediate and cooperating with such races, said cage including a ring having spaced projections to enter between the balls in the application of the cage for ball spacing, and fingers formed wholly from the projections with their free ends projecting in opposition to the spacing end of the projections to define abutments to directly bear against one of the races of the bearings to prevent movement of the cage in one direction axially of the bearing.

10. The combination of a ball bearing including inner and outer races and cooperating balls, of a cage for the balls formed with ball spacing projections, means at one terminal of the projections to cooperate with the balls to limit movement of the cage relative to the balls in one direction axially of the bearing, and fingers carried by the projections to abut one of the races to prevent movement of the cage in an opposite direction relative to the balls and axially of the bearing.

FREDERICK OSGOOD HICKLING.